(12) United States Patent
Chen et al.

(10) Patent No.: US 9,951,208 B2
(45) Date of Patent: Apr. 24, 2018

(54) SILICA SHIELDING AGENTS AND RELATED METHODS

(71) Applicant: Bridgestone Corporation, Chuo-ku (JP)

(72) Inventors: Yaohong Chen, Akron, OH (US); Arif O. Gozen, Akron, OH (US); Toshihiro Uchiyama, Chuo-ku (JP)

(73) Assignee: Bridgestone Corporation, Chuo-ku (JP)

( * ) Notice: Subject to any disclaimer, the term of this patent is extended or adjusted under 35 U.S.C. 154(b) by 84 days.

(21) Appl. No.: 14/933,140

(22) Filed: Nov. 5, 2015

(65) Prior Publication Data
US 2016/0130423 A1  May 12, 2016

Related U.S. Application Data

(60) Provisional application No. 62/076,153, filed on Nov. 6, 2014.

(51) Int. Cl.
*C08K 5/548* (2006.01)
*C08K 3/36* (2006.01)
*C08K 5/5419* (2006.01)

(52) U.S. Cl.
CPC .............. *C08K 5/548* (2013.01); *C08K 3/36* (2013.01); *C08K 5/5419* (2013.01)

(58) Field of Classification Search
CPC ......... C08K 5/548; C08K 3/36; C08K 5/5419
See application file for complete search history.

(56) References Cited

U.S. PATENT DOCUMENTS

| | | | |
|---|---|---|---|
| 3,377,311 A * | 4/1968 | Roch | C08K 9/06 273/DIG. 29 |
| 4,714,733 A | 12/1987 | Itoh et al. | |
| 5,811,479 A | 9/1998 | Labauze | |
| 6,013,718 A | 1/2000 | Cabioch et al. | |
| 6,140,393 A * | 10/2000 | Bomal | B60C 1/00 523/212 |
| 6,211,278 B1 | 4/2001 | Vanel | |
| 6,245,834 B1 | 6/2001 | Bomal et al. | |
| 6,353,045 B1 | 3/2002 | Kayser et al. | |
| 6,362,253 B1 | 3/2002 | Durel | |
| 6,465,544 B1 | 10/2002 | Bomal et al. | |
| 6,900,263 B2 | 5/2005 | Hodge | |
| 6,984,683 B2 | 1/2006 | Luginsland et al. | |
| 7,799,870 B2 | 9/2010 | Hergenrother et al. | |
| 7,836,928 B2 | 11/2010 | Hogan et al. | |
| 8,329,297 B2 | 12/2012 | Hergenrother et al. | |
| 2005/0222446 A1 | 10/2005 | Plehiers | |
| 2008/0299046 A1 | 12/2008 | White et al. | |
| 2009/0186961 A1* | 7/2009 | Araujo Da Silva | B60C 1/00 523/150 |
| 2010/0178266 A1 | 7/2010 | Huggins et al. | |
| 2011/0009547 A1 | 1/2011 | DaSilva et al. | |
| 2013/0281588 A1 | 10/2013 | Lin et al. | |

FOREIGN PATENT DOCUMENTS

| | | |
|---|---|---|
| EP | 0761748 B1 | 5/2004 |
| EP | 1484359 A1 | 12/2004 |
| EP | 1273634 B1 | 8/2005 |
| EP | 2128186 A1 | 12/2009 |
| EP | 1924608 B1 | 1/2010 |
| JP | S3915334 | 0/1964 |
| JP | 2001192506 A | 7/2001 |
| JP | 4473429 B2 | 6/2010 |
| JP | 4482210 B2 | 6/2010 |
| WO | 2009062733 A2 | 5/2009 |
| WO | 2011075121 A1 | 6/2011 |

OTHER PUBLICATIONS

Brinke, J.W. Ten, et al., "The Influence of Silane Sulfur and Carbon Rank on Processing of a Silica Reinforced Tire Tread Compound," Rubber Chemistry and Technology, vol. 76, p. 12+, 2003.
Suzuki, 'Preparation of poly(dimethylsiloxane) macromonomers, Polymer, vol. 30, p. 333, 1989.
Ladouce-Stelandre et al., Dynamic Mechanical Properties, Rubber Chem. Tech. vol. 76, p. 145, 2003.

* cited by examiner

*Primary Examiner* — Bijan Ahvazi
*Assistant Examiner* — Thuy-Ai N Nguyen
(74) *Attorney, Agent, or Firm* — Meredith E. Hooker; Jenny L. Sheaffer

(57) ABSTRACT

Disclosed herein are rubber compositions comprising at least one conjugated diene polymer or copolymer, silica filler, and a silica shielding agent of formula (I), and related methods such as for improving silica dispersability in silica-filled rubber compositions. Also disclosed herein are tire components, such as tire treads containing the rubber compositions disclosed herein.

20 Claims, No Drawings

SILICA SHIELDING AGENTS AND RELATED METHODS

RELATED APPLICATION

This application claims priority to and the benefit of U.S. Application No. 62/076,153, filed Nov. 6, 2014, the entirety of which is incorporated herein by reference.

FIELD OF THE DISCLOSURE

The present disclosure relates to rubber compositions comprising at least one conjugated diene polymer or copolymer, silica filler, and a specific silica shielding agent, and also to related methods. The rubber compositions are useful in producing tire components such as tire treads. The present disclosure also relates to tire components containing the rubber compositions disclosed herein.

BACKGROUND

Silica is frequently used as a filler in rubber compositions that are intended for or are utilized in tire components, primarily tire treads. While silica can impart certain desirable properties (e.g., decreased rolling resistance, improved abrasion resistance) to the rubber compositions into which it is incorporated, successful incorporation and mixing of the silica can be difficult for various reasons including the tendency of the silica to agglomerate together which can lead to uneven and inconsistent dispersion throughout the rubber composition. The limited compatibility of silica (as compared to other fillers such as carbon black) with the conjugated diene (co)polymer(s) used in these rubber compositions has led to the use of relatively expensive functionalized (co)polymer(s), as well as processing and dispersing aids and coupling agents. Along with the additional expense involved with adding coupling agents, their use can have other disadvantages. For example, unreacted silica coupling agent that remains in a rubber composition can lead to an undesirable decrease in abrasion resistance. Increased mixing of the rubber composition (allowing for more complete reaction of the silica and the coupling agent) can decrease this undesirable result; however, longer mixing times can themselves lead to higher costs and other disadvantages.

SUMMARY

Disclosed herein are rubber compositions comprising at least one conjugated diene polymer or copolymer, silica filler, and a specific silica shielding agent, and also disclosed are related methods. Also disclosed herein are tire components, such as tire treads containing the rubber compositions disclosed herein.

In a first embodiment, a rubber composition comprising (a) 100 phr of at least one conjugated diene-based polymer or copolymer; (b) silica filler; and (c) 1 to 20 phr of a silica shielding agent having formula (I) is disclosed. Formula (I) is represented by the following structure: $R^1(SiR^2R^3O)_nH$. According to formula (I), $R^1$ is a hydrocarbyl having 4 to 20 carbons, $R^2$ and $R^3$ are independently selected from phenyl, substituted phenyl, and hydrocarbyl of C1 to C4, and n is an integer from 1-10.

In a second embodiment, a method is provided for improving the dispersability of silica in a silica-filled conjugated diene-based polymer or copolymer containing rubber composition. The method comprises preparing a rubber composition by mixing (a) 100 phr of at least one conjugated diene-based polymer or copolymer; (b) silica filler; and (c) 1 to 20 phr of a silica shielding agent having formula (I). Formula (I) is represented by the following structure: $R^1(SiR^2R^3O)_nH$. According to formula (I), $R^1$ is a hydrocarbyl having 4 to 20 carbons, $R^2$ and $R^3$ are independently selected from phenyl, substituted phenyl, and hydrocarbyl of C1 to C4, and n is an integer from 1-10.

DETAILED DESCRIPTION

Disclosed herein are rubber compositions comprising at least one conjugated diene polymer or copolymer, silica filler, and a specific silica shielding agent, and also disclosed are related methods. Also disclosed herein are tire components, such as tire treads containing the rubber compositions disclosed herein.

In a first embodiment, a rubber composition comprising (a) 100 phr of at least one conjugated diene-based polymer or copolymer; (b) silica filler; and (c) 1 to 20 phr of a silica shielding agent having formula (I) is disclosed. Formula (I) is represented by the following structure: $R^1(SiR^2R^3O)_nH$. According to formula (I), $R^1$ is a hydrocarbyl having 4 to 20 carbons, $R^2$ and $R^3$ are independently selected from phenyl, substituted phenyl, and hydrocarbyl of C1 to C4, and n is an integer from 1-10.

In a second embodiment, a method is provided for improving the dispersability of silica in a silica-filled conjugated diene-based polymer or copolymer containing rubber composition. The method comprises preparing a rubber composition by mixing (a) 100 phr of at least one conjugated diene-based polymer or copolymer; (b) silica filler; and (c) 1 to 20 phr of a silica shielding agent having formula (I). Formula (I) is represented by the following structure: $R^1(SiR^2R^3O)_nH$. According to formula (I), $R^1$ is a hydrocarbyl having 4 to 20 carbons, $R^2$ and $R^3$ are independently selected from phenyl, substituted phenyl, and hydrocarbyl of C1 to C4, and n is an integer from 1-10.

Definitions

The terminology as set forth herein is for description of the embodiments only and should not be construed as limiting the invention as a whole.

Unless otherwise indicated, the terms "alkyl" and "alkyl group" are used interchangeably herein to refer to a univalent group derived from an alkane by removal of a hydrogen atom from any carbon atom. Generally, the terms should be understood to include both branched and linear/unbranched structures.

Unless otherwise indicated, the term "hydrocarbyl group" is used herein to refer to a univalent group formed by removing a hydrogen atom from a hydrocarbon. The term "hydrocarbon" is used herein to refer to a compound formed from hydrogen and carbon and containing a carbon backbone.

Unless otherwise indicated, the term "hydrocarbyl derivative group" is used to refer to a univalent group forming by removing a hydrogen from a hydrocarbon derivative. The term "hydrocarbon derivative" is used herein to refer to a compound having a carbon backbone and containing hydrogen, carbon and at least one heteroatom. The term "heteroatom" is used to refer to O, N or S.

Unless otherwise indicated herein, the abbreviation "mL" is used for millimeters.

Unless otherwise indicated herein, the abbreviation "M" is used for molar concentration (i.e., moles per liter).

Unless otherwise indicated herein, the term "Mooney viscosity" refers to the compound Mooney viscosity, $ML_{1+4}$. As those of skill in the art will understand, a rubber composition's Mooney viscosity is measured prior to vulcanization or curing.

Unless otherwise indicated, the term "phenyl" is used herein to refer to a univalent group formed by removing a hydrogen atom from benzene. Unless otherwise indicated, the term "substituted phenyl" is used herein to refer to a phenyl group that contains one or more than one hydrocarbyl substituents.

As used herein, the term "phr" means parts per one hundred parts rubber. The 100 parts rubber is based upon the total amount of at least one conjugated diene-based polymer or copolymer.

Silica Shielding Agent

As discussed above, according to the first and second embodiments disclosed herein, the silica shielding agent having formula (I) is used in an amount of 1 to 20 phr in the rubber composition. In certain embodiments of the first and second embodiments, the silica shielding agent is used in an amount of 1 to 10 phr, including 2 to 5 phr, in the rubber composition. In other words, in certain embodiments of the first and second embodiments, the rubber composition comprises 1 to 10 phr of the silica shielding agent having formula (I), including 2 to 5 phr. It should be understood that the foregoing amounts and ranges apply to all variations of formula (I), as discussed in more detail in the following paragraphs. As discussed above, according to the first and second embodiments disclosed herein, within formula (I) n is an integer from 1-10. In certain embodiments of the first and second embodiments, the silica shielding agent has the following formula: $R^1(SiR^2R^3O)H$, wherein $R^1$ is a hydrocarbyl having 4 to 20 carbons, and $R^2$ and $R^3$ are independently selected from phenyl, substituted phenyl, and hydrocarbyl of C1 to C4; in other words, in the foregoing embodiment, the n in formula (I) is 1. In such embodiments, the silica shielding agent can be described as comprising a compound having the following formula: $R^1(SiR^2R^3O)H$, wherein $R^1$ is a hydrocarbyl having 4 to 20 carbons, and $R^2$ and $R^3$ are independently selected from phenyl, substituted phenyl, and hydrocarbyl of C1 to C4. In other embodiments of the first and second embodiments, the silica shielding agent has the following formula: $R^1(SiR^2R^3O)_nH$, wherein n is 3 to 10, $R^1$ is a hydrocarbyl having 4 to 20 carbons, and $R^2$ and $R^3$ are independently selected from phenyl, substituted phenyl, and hydrocarbyl of C1 to C4; in other words, in the foregoing embodiment, the n in formula (I) is 3-10. In such embodiments, the silica shielding agent can be described as comprising a compound having the following formula: $R^1(SiR^2R^3O)_nH$, wherein n is 3 to 10, $R^1$ is a hydrocarbyl having 4 to 20 carbons, and $R^2$ and $R^3$ are independently selected from phenyl, substituted phenyl, and hydrocarbyl of C1 to C4.

As discussed above, according to the first and second embodiments disclosed herein, within formula (I) $R^1$ is a hydrocarbyl group having from 4 to 20 carbon atoms. In certain exemplary embodiments according to the first and second embodiments disclosed herein, $R^1$ comprises a hydrocarbyl group having from 6 to 12 carbon atoms. In certain exemplary embodiments according to the first and second embodiments disclosed herein, $R^1$ comprises a linear or branched alkyl group (having from 4 to 20 carbon atoms, including from 6 to 12 carbon atoms).

As discussed above, according to the first and second embodiments disclosed herein, within formula (I) $R^2$ and $R^3$ are independently selected from phenyl, substituted phenyl, and hydrocarbyl of C1 to C4. The phrase independently selected from is used to indicate that $R^2$ and $R^3$ are not necessarily the same, although in certain embodiments they may be the same. As well, in certain embodiments, more than one $R^2$ and more than one $R^3$ may be present in a particular silica shielding agent (i.e., when n is greater than 1); in such embodiments, each $R^2$ and each $R^3$ may be independently selected from phenyl, substituted phenyl, and hydrocarbyl of C1 to C4 (although having each $R^2$ and each $R^3$, respectively, be the same will generally make synthesis simpler). In certain exemplary embodiments according to the first and second embodiments disclosed herein, $R^2$ and $R^3$ each independently comprise phenyl or substituted phenyl. In those embodiments where $R^2$, $R^3$, or both comprise substituted phenyl, the substituent comprises at least one hydrocarbyl group, preferably having at least 4 carbon atoms, at least one hydrocarbyl derivative group having at least 4 carbon atoms, at least one alkoxy group having at least 4 carbon atoms. In certain such embodiments, the at least one hydrocarbyl substituent has 4 to 20 carbon atoms, including 4 to 8 carbon atoms. In certain embodiments, the at least one hydrocarbyl derivative group has 4 to 20 carbon atoms, including 4 to 8 carbon atoms. In certain embodiments, the at least one alkoxy group has 4 to 20 carbon atoms, including 4 to 8 carbon atoms. In other exemplary embodiments according to the first and second embodiments disclosed herein, $R^2$ and $R^3$ each independently comprise hydrocarbyl having 1 to 4 carbons. In certain embodiments according to the first and second embodiments disclosed herein, $R^2$ and $R^3$ each independently comprise one of methyl, ethyl, propyl, iso-propyl, butyl, iso-butyl, or sec-butyl.

Silica shielding agents having formula (I) may be synthesized from commercially available ingredients using standard reaction procedures. More specifically commercially available starting ingredients include halogenated siloxanes having the desired number of Si and $R^2$ and $R^3$ substituents as well as polysiloxanes (linear or cyclic, again having the desired number of Si and $R^2$ and $R^3$ substituents). Generally, the silica shielding agents having formula (I) can be synthesized by reacting one of the foregoing starting ingredients with an alkyl-containing compound having a leaving group (e.g., alkyl metal compounds, especially alkyl alkali metal compounds).

Conjugated Diene-Based Polymer or Copolymer

As discussed above, according to the first and second embodiments disclosed herein, the rubber composition comprises 100 phr of at least one conjugated diene-based polymer or copolymer. Thus, it should be understood, that the at least one conjugated diene-containing polymer or copolymer may be a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one conjugated diene-containing polymer is utilized. Examples of suitable conjugated diene monomers that can be contained within the at least one conjugated diene-containing polymer or copolymer according to certain embodiments of the first and second embodiments disclosed herein include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated dienes may be utilized in certain embodiments. Non-limiting examples of suitable polymers and copolymers for use as the at least one conjugated diene-containing polymer or copolymer according to certain embodiments of the first and second embodiments disclosed herein include, but are not limited to, polybutadiene, styrene-butadiene rubber, styrene-isoprene rubber, styrene-butadiene-isoprene rubber, natural rubber, and polyisoprene.

In certain embodiments according to the first and second embodiments disclosed herein, the at least one conjugated diene-containing polymer or copolymer of the rubber composition comprises a functionalized polymer or copolymer. In certain such embodiments, the rubber composition comprises 5 to 100 phr of at least one functionalized polymer or copolymer, including 10 to 90 phr, 10 to 70 phr, and 10 to 50 phr. In certain embodiments according to the first and second embodiments disclosed herein, the functionalized polymer or copolymer comprises a polymer or copolymer with a silica-reactive functional group. Non-limiting examples of silica-reactive functional groups that are known to be utilized in functionalizing conjugated diene polymers or copolymers and are suitable for use in the rubber compositions of certain embodiments of the first and second embodiments disclosed herein include nitrogen-containing functional groups, silicon-containing functional groups, oxygen or sulfur-containing functional groups, and metal-containing functional group. As used herein, the term functionalized polymer or copolymer should be understood to include polymers and copolymers with a functional group at one or both terminus (e.g., from use of a functionalized initiator, a functionalized terminator, or both), a functional group in the main chain of the polymer, and combinations thereof. For example, a silica-reactive functionalized polymer may have the functional group at one or both terminus, in the main chain thereof, or both at one or both terminus and in the main chain thereof.

Non-limiting examples of nitrogen-containing functional groups that are known to be utilized in functionalizing conjugated diene-containing polymers and copolymers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first and second embodiments disclosed herein, the rubber composition comprises a functionalized conjugated diene-containing polymer or copolymer having at least one functional group selected from the foregoing list.

Non-limiting examples of silicon-containing functional groups that are known to be utilized in functionalizing conjugated diene-containing polymers and copolymers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing conjugated diene-containing polymers and copolymers also include those disclosed in U.S. Pat. No. 6,369,167, the entire disclosure of which is hereby incorporated by reference. In certain embodiments according to the first and second embodiments disclosed herein, the rubber composition comprises a functionalized conjugated diene-containing polymer or copolymer having at least one functional group selected from the foregoing list.

Non-limiting examples of oxygen or sulfur-containing functional groups that are known to be utilized in functionalizing conjugated diene-containing polymers and copolymers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first and second embodiments disclosed herein, the rubber composition comprises a functionalized conjugated diene-containing polymer or copolymer having at least one functional group selected from the foregoing list.

Generally, conjugated diene-containing polymers and copolymers may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of polymerization via an anionic mechanism is given.

When conjugated diene-containing polymers or copolymers are produced through anionic polymerization, an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

Methods for producing conjugated diene-containing polymers or copolymers through anionic polymerization using an organic alkaline metal compound as the polymerization initiator are not particularly limited. For example, a conjugated diene-containing polymer or copolymer can be produced by polymerizing the conjugated diene monomer alone or a mixture of the conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

Anionic polymerization may be carried out in the presence of a randomizer. The randomizer can control the microstructure of the conjugated diene compound, and has an action that 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalent per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and a vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Silica Filler

As discussed above, according to the first and second embodiments, the rubber composition comprises silica filler. In certain embodiments according to the first and second embodiments, the rubber composition comprises 5 to 150 phr of silica filler.

Suitable silica fillers for use in the rubber compositions according to the first and second embodiments disclosed herein are well known. Non-limiting examples of silica fillers suitable for use in the rubber compositions of certain embodiments of the first and second embodiments disclosed herein include, but are not limited to, precipitated amorphous silica, wet silica (hydrated silicic acid), dry silica (anhydrous silicic acid), fumed silica, calcium silicate and the like. Other suitable fillers for use in rubber compositions of certain embodiments of the first and second embodiments disclosed herein include, but are not limited to, aluminum silicate, magnesium silicate, and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the first and second embodiments disclosed herein, the rubber composition comprises a silica filler having a surface area (as measured by the BET method) of about 32 $m^2/g$ to about 400 $m^2/g$, with the range of about 100 $m^2/g$ to about 300 $m^2/g$ being preferred, and the range of about 150 $m^2/g$ to about 250 $m^2/g$ being most preferred. In certain embodiments of the first and second embodiments disclosed herein, the rubber composition comprises silica filler having a pH of about 5.5 to about 7 or slightly over 7, preferably about 5.5 to about 6.8.

In certain embodiments of the first and second embodiments disclosed herein, the rubber composition comprises a silica filler in an amount of 25 to 150 phr, including 35 to 150 phr, 25 to 125 phr, 25 to 100 phr, 25 to 80 phr, 35 to 125 phr, 35 to 100 phr, and 35 to 80 phr. In certain embodiments, the useful upper range for the amount of silica filler can be considered to be somewhat limited by the high viscosity imparted by fillers of this type. Some of the commercially available silica fillers which can be used in the rubber compositions of certain embodiments of the first and second embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165MP), and J. M. Huber Corporation. X Silica Coupling Agent Optionally, i.e., in certain embodiments of the first and second embodiments, a silica coupling agent is used (i.e., mixed with (a), (b), and (c)). Thus, according to certain embodiments of the first and second embodiments disclosed herein, the rubber compositions further comprise (include) a silica coupling agent. As used herein, the phrase silica coupling agent refers to a conventional type of silica coupling agent, such as those having a silane and a constituent component or moiety that can react with a polymer, particularly a vulcanizable polymer. Generally, the silica coupling agent acts as a connecting bridge between silica and the conjugated diene-based polymer or copolymer. Suitable silica coupling agents include those containing groups such as mercapto, blocked mercapto, polysulfide, amino, vinyl, epoxy, and combinations thereof. The amount of silica coupling agent used in the rubber compositions according to the first and second embodiments disclosed herein, may vary. In certain embodiments of the first and second embodiments disclosed herein, the rubber compositions comprise silica coupling agent in an amount of 0.01 to 40 parts by weight per 100 parts of silica, including 0.01 to 30 parts by weight per 100 parts of silica, and 0.01 to 25 parts by weight per 100 parts of silica. In certain embodiments according to the first-fourth embodiments disclosed herein, the rubber composition comprises 0.01 to 20 phr silica coupling agent, including 1 to 15 phr, and including 3 to 10 phr.

Examples of silica coupling agents suitable for use in the rubber compositions of certain exemplary embodiments of the first and second embodiments disclosed herein include, but are not limited to, alkyl alkoxysilanes (including polysulfide-containing alkyl alkoxysilanes), blocked mercaptosilanes, and mercaptosilanes. Alkyl alkoxysilanes have the general formula $R^6_p Si(OR^7)_{4-p}$ where each $R^2$ is independently a monovalent organic group, and p is an integer from 1 to 3, with the proviso that at least one $R^7$ is an alkyl group. Preferably p is 1. Generally, each $R^7$ independently comprises $C_1$ to $C_{20}$ aliphatic, $C_5$ to $C_{20}$ cycloaliphatic, or $C_6$ to $C_{20}$ aromatic; each $R^2$ independently comprises $C_1$ to $C_6$ aliphatic. In certain exemplary embodiments, each $R^7$ independently comprises $C_6$ to $C_{15}$ aliphatic and in additional embodiments each $R^7$ independently comprises $C_8$ to $C_{14}$ aliphatic. Mercaptosilanes have the general formula HS—$R^a$—Si($R^b$)($R^c$)($R^c$) where $R^a$ is a divalent organic group, $R^b$ is a halogen atom or an alkoxy group, each $R^c$ is independently a halogen, an alkoxy group or a monovalent organic group. The halogen is chlorine, bromine, fluorine, or iodine. The alkoxy group preferably has 1-3 carbon atoms. Blocked mercaptosilanes have the general formula B—S—$R^8$—Si—$X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^8$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in the rubber compositions of certain exemplary embodiments of the first and second embodiments disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyl trimethoxysilane, hexyltrimethoxysilane, heptyltrimethoxysilane, nonyltrimethoxysilane, decyltrimethoxysilane, dodecyltrimethoxysilane, tetradecyltri-methoxysilane, octadecyl-trimethoxysilane, methyloctyl dimethoxysilane, and mixtures thereof.

Non-limiting examples of alkyl alkoxysilanes suitable for use in the rubber compositions of certain exemplary embodiments of the first and second embodiments disclosed herein include, but are not limited to, hexyltriethoxysilane, heptyltriethoxysilane, octyltriethoxysilane, nonyltriethoxysilane, decyltriethoxysilane, dodecyltriethoxysilane, tetradecyltriethoxysilane, octadecyltriethoxy-silane, hexyltrimethoxysilane, heptyltrimethoxysilane, octyltrimethoxysilane, nonyltrimethoxysilane, decyltrimethoxysilane, dodecyltrimethoxysilane, tetradecyltri-methoxysilane, octadecyltrimethoxysilane, and mixtures thereof.

Non-limiting examples of polysulfide-containing alkyl alkoxysilanes suitable for use in the rubber compositions of certain exemplary embodiments of the first and second embodiments disclosed herein include, but are not limited to, bis(trialkoxysilylorgano)disulfides and bis(trialkoxysilylorgano)tetrasulfides. Specific non-limiting examples of bis(trialkoxysilylorgano)disulfides include 3,3'-bis(triethoxysilylpropyl)disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyldi-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silane coupling agents include bis(3-triethoxysilylpropyl)tetrasulfide, bis(2-triethoxysilylethyl)tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbomoyl tetrasulfide, 3-trimethoxysilylpropylbenzothiazole tetrasulfide, 3-triethoxysilylpropylbenzothiazole tetrasulfide, and mixtures thereof. Bis(3-triethoxysilylpropyl)tetrasulfide is sold commercially as Si69® by Evonik Degussa Corporation.

Non-limiting examples of mercaptosilanes suitable for use in the rubber compositions of certain exemplary embodiments of the first and second embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercaptosilanes suitable for use in the rubber composition of certain exemplary embodiments of the first and second embodiments disclosed herein include, but are not limited to, but are not limited to, those described in U.S. Pat. Nos. 6,127,468; 6,204,339; 6,528,673; 6,635,700; 6,649,684; 6,683,135; the disclosures of which are hereby incorporated by reference. Representative examples of the silanes include, but are not limited to, 2-triethoxysilyl-1-ethylthioacetate; 2-trimethoxysilyl-1-ethylthioacetate; 2-(methyldimethoxy-silyl)-1-ethylthioacetate; 3-trimethoxysilyl-1-propylthioacetate; triethoxysilylmethylthioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethox-ysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propyl-thioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-trimethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyethyltrithiophosphonate; 3-triethoxysilyl-1-propyldimethyldithiophosphinate; 3-triethoxysilyl-1-propyldiethyldithio-phosphinate; tris-(3-methyldimethoxysilyl-1-propyl)trithiophosphate; bis-(3-methyl-dimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethyl-thiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethio sulfonate; triethoxysilylmethylxylenethiosulfonate, and the like. Mixtures of various blocked mercaptosilanes can be used. A further example of a blocked mercaptosilane is NXT™ silane (3-octanoyl-thio-1-propyltriethoxysilane), commercially available from Momentive Performance Materials Inc. of Albany, N.Y.

Reinforcing Filler

In certain embodiments of the first and second embodiments disclosed herein, the rubber composition comprises 5 to 200 phr of reinforcing filler. As explained below, the 5 to 200 phr of reinforcing filler should be understood to include the silica filler previously discussed; thus, the 5 to 200 phr of reinforcing filler represents the total amount of all reinforcing filler(s). In certain embodiments of the first and second embodiments, the rubber composition comprises 5 to 100 phr of reinforcing filler, including 20 to 100 phr. As used herein, the term "reinforcing filler" is intended to include both carbon black filler and inorganic filler (of which silica is only one example). Thus, in certain embodiments of the first and second embodiments disclosed herein, the rubber composition includes (in total) 5 to 200 phr, including 5 to 100 phr, including 20 to 100 phr, of at least one of: one or more carbon blacks, and one or more inorganic fillers. In certain such embodiments, the rubber composition includes both at least one carbon black and at least one inorganic filler. Suitable inorganic fillers for use in the rubber compositions according to the first and second embodiments are not particularly limited and non-limiting examples include: silica, aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_3 4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), calcium silicate ($Ca_2SiO_4$ etc.), magnesium carbonate, magnesium hydroxide ($MH(OH)_2$), magnesium oxide (MgO), magnesium carbonate ($MgCO_3$), magnesium silicate ($Mg_2SiO_4$, $MgSiO_3$ etc.), magnesium calcium silicate ($CaMgSiO_4$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

As discussed above, in certain embodiments of the first and second embodiments disclosed herein, the at least one reinforcing filler includes one or more carbon blacks. In certain embodiments of the first and second embodiments disclosed herein, the at least one reinforcing filler comprises carbon black in an amount of from zero to about 50% by weight of the total reinforcing filler, including about 5% to about 30%, from about 5% to about 20%, from about 10% to about 30%, and about 10% to about 20% by weight of the total reinforcing filler. In certain embodiments of the first and second embodiments disclosed herein, the carbon black comprises no more than about 30% by weight of the total reinforcing filler in the rubber composition. In certain embodiments of the first and second embodiments where carbon black is present, the rubber composition comprises 5 to 100 phr of at least one carbon black. Generally, suitable carbon black for use in the rubber composition of certain embodiments of the first and second embodiments disclosed herein includes any of the commonly available, commercially-produced carbon blacks, including those having a surface area of at least about 20 $m^2/g$ and, more preferably, at least about 35 $m^2/g$ up to about 200 $m^2/g$ or higher. Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first and second embodiments disclosed herein, the rubber composition includes a mixture of two or more of the foregoing blacks. Typical suitable carbon blacks for use in certain embodiments of the first and second embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

Other Ingredients

In certain embodiments of the first and second embodiments disclosed herein, the rubber composition includes a cure package. Generally, the cure package includes at least one of: a vulcanizing agent; a vulcanizing accelerator; a vulcanizing activator (e.g., zinc oxide, stearic acid, and the like); a vulcanizing inhibitor; and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-fourth embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other ingredients that may be employed in the rubber compositions of certain embodiments of the first and second embodiments disclosed herein are well known to those of skill in the art and include oils (processing and extender), waxes, processing aids, tackifying resins, reinforcing resins, peptizers, and one or more additional rubbers.

Various types of processing and extending oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15 and FLEXON 683 from EXXONMOBLE, VIVATEC 200 from BP, PLAX-OLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer. Generally, the amount of processing oil used ranges from 1 to 40 phr, including 2 to 30 phr, including 3 to 20 phr.

Methods for Improving Dispersability of Silica

As discussed above, according to the second embodiment disclosed herein, a method is provided for improving the dispersability of silica in a silica-filled conjugated diene-based polymer or copolymer containing rubber composition. The method comprises preparing a rubber composition by mixing (a) 100 phr of at least one conjugated diene-based polymer or copolymer; (b) silica filler; and (c) 1 to 20 phr of a silica shielding agent having formula (I). Optionally, i.e., in certain embodiments a silica coupling agent is also mixed with (a), (b), and (c). Formula (I) is represented by the following structure: $R^1(SiR^2R^3O)_nH$. According to formula (I), $R^1$ is a hydrocarbyl having 4 to 20 carbons, $R^2$ and $R^3$ are independently selected from phenyl, substituted phenyl, and hydrocarbyl of C1 to C4, and n is an integer from 1-10. The method of the second embodiment should be understood to include preparation of a rubber composition that includes all of the variations and permutations in composition, as discussed above for the first embodiment.

In certain embodiments of the second embodiment, the improvement in dispersability of silica in a silica-filled conjugated diene-based polymer or copolymer based rubber composition comprises (or can be understood as resulting from) a reduction in the Mooney viscosity of the silica-filled conjugated diene-based polymer or copolymer rubber containing composition. The reduction in Mooney viscosity is compared to a rubber composition that has the same ingredients other than comprising 0 phr of the silica shielding agent ("a comparative rubber composition"). It should be understood that the particular amount of reduction in Mooney viscosity can vary. In certain embodiments according to the second embodiment, the method comprises a reduction in Mooney viscosity of at least about 10% as compared to a comparative rubber composition. In other embodiments according to the second embodiment, the method comprises a reduction in Mooney viscosity of at least about 20%, including at least about 20% to at least about 50%, both as compared to a comparative rubber composition.

In certain embodiments of the second embodiment, the method of improving the dispersability of silica also includes (or further comprises) reducing the cure time of the silica-filled conjugated diene-based polymer or copolymer based rubber composition. The method comprises preparing a rubber composition by mixing (a) 100 phr of at least one conjugated diene-based polymer or copolymer; (b) silica filler; and (c) 1 to 20 phr of a silica shielding agent having formula (I). Optionally, i.e., in certain embodiments a silica coupling agent is also mixed with (a), (b), and (c). Formula (I) is represented by the following structure: $R^1(SiR^2R^3O)_nH$, wherein $R^1$ is a hydrocarbyl having 4 to 20 carbons, $R^2$ and $R^3$ are independently selected from phenyl, substituted phenyl, and hydrocarbyl of C1 to C4, and n is an integer from 1-10. The reduction in cure time is compared to a rubber composition that has the same ingredients other than comprising 0 phr of the silica shielding agent ("a comparative rubber composition"), by measuring the time to cure (such as in minute) during curing of the rubber composition, such as described in the working Examples herein, and is frequently measured at a given temperature (e.g., 160° C.) at 5% of cure completion (t5), 90% of cure (t90), or another % of cure completion. It should be understood that the particular reduction in cure time can vary. In certain embodiments according to the second embodiment, the method comprises a reduction in cure time t90 (e.g., at 160° C.) of at least about 10% as compared to a comparative rubber composition. In other embodiments according to the second embodiment, the method comprises an improvement in cure time t90 (e.g., at 160° C.) of at least about 15% as compared to a comparative rubber composition, including improvements of at least about 20%, and at least about 25%. In certain embodiments, the method comprises a reduction in cure time t90 of about 10% to about 40%, including about 10% to about 30%, and about 10% to about 25%, each as compared to a comparative rubber composition.

In certain embodiments of the second embodiment, the method of improving the dispersability of silica also includes (or further comprises) improving the abrasion resistance of the silica-filled conjugated diene-based polymer or copolymer based rubber composition. According to such embodiments, the method comprises preparing a rubber composition by mixing (a) 100 phr of at least one conjugated diene-based polymer or copolymer; (b) silica filler; and (c) 1 to 20 phr of a silica shielding agent having formula (I). Optionally, i.e., in certain embodiments a silica coupling agent is also mixed with (a), (b), and (c). Formula (I) is represented by the following structure: $R^1(SiR^2R^3O)_nH$ wherein $R^1$ is a hydrocarbyl having 4 to 20 carbons, $R^2$ and $R^3$ are independently selected from phenyl or substituted phenyl, and n is an integer from 1-10. Thus, when $R^2$ and $R^3$ of the silica shielding agent according to formula (I) are independently selected from phenyl or substituted phenyl, the additional benefit of an improvement in the abrasion resistance of the rubber composition is unexpectedly obtained. The improvement in abrasion resistance is particularly unexpected in view of the reduction in Mooney viscosity that accompanies the use of the silica shielding agent, because a reduction in Mooney viscosity of a rubber composition is usually accompanied by a decrease in its abrasion resistance. The improvement in abrasion resistance is compared to a rubber composition that has the same ingredients other than comprising 0 phr of the silica shielding agent ("a comparative rubber composition"), by measuring the weight loss exhibited during an abrasion test such as the Lambourn Abrasion test described in the working Examples herein which is frequently measured at 25% slip, 65% slip, or both. It should be understood that the particular amount of improvement in abrasion resistance can vary. In certain embodiments according to the second embodiment, the method comprises an improvement in abrasion resistance of at least about 10% (at 25% slip, 65% slip, or both) as compared to a comparative rubber composition. In other embodiments according to the second embodiment, the method comprises an improvement in abrasion resistance of at least about 15% (at 25% slip, 65% slip, or both) as compared to a comparative rubber composition, including improvements of at least about 20% (at 25% slip) and at least about 25% (at 25% slip). In certain embodiments, the method comprises an improvement in abrasion reduction of about 10% to about 40%, including about 10% to about 35%, both as compared to a comparative rubber composition.

Preparation of the Rubber Compositions

Generally, the rubber compositions disclosed herein may be formed by mixing together the ingredients for the rubber composition as disclosed above by methods known in the art, such as, for example, by kneading the ingredients together in a Banbury mixer or on a milled roll. The methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. In certain embodiments, a remill mixing stage is included between the non-productive master-batch mixing stage and the final productive mixing stage. In certain embodiments, more than one non-productive master-batch mixing stage may be used. The term final productive mixing stage is also known to those of skill in the art and generally understood to be the mixing stage where the vulcanizing agents and vulcanization accelerators are added into the rubber composition.

In certain embodiments, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular conjugated diene-based copolymer, silica filler, and other ingredients (e.g., stearic acid, antioxidant, and curative package ingredients) utilized in the following examples should not be interpreted as limiting since other such ingredients consistent with the disclosure in the Detailed Description can be utilized in substitution. In other words, the particular silica shielding agents and their amounts in the following examples should be understood to apply to the more general content of the Detailed Description.

Example 1: Synthesis of n-hexylhexamethyltrisiloxan-1-ol Silica Shielding Agent 1,5-Dichlorohexamethyl-trisiloxane (HD$_3$C$_{12}$, 13.9 grams, 0.05 mol) in ether (50 mL) was cooled down to −78° C. and was dropwise charged with n-hexyllithium (2.3 M hexane, 0.045 moles, 19.6 mL). The reaction mixture was stirred until it reached room temperature and then drop wise added into a rapidly stirred two-phase system consisting of 100 mL of water, 100 mL of ether, 2.88 grams (0.03 moles) of ammonium carbonate and 35 grams of sodium chloride to saturate the aqueous phase. When the addition was complete, the aqueous layer was extracted with ether and the combined ether fractions were dried over anhydrous sodium sulfate. The product obtained after removing the solvent with rotary evaporator was confirmed by $^1$H-NMR (CDCl$^3$: d 0.05-0.15 (s, 18, Si(CH$_3$H), 0.5 (s, 1.6, SiCH$_2$), 0.9 (s, 3, CH$_3$) and 1.3 (s, 8, CH$_2$) and 2.25 (br-s, 1, OH) ppm).

Example 2: Synthesis of n-hexyldiphenylsilanol Silica Shielding Agent

To a solution of hexaphenylcyclotrisiloxane (29.7 grams, 0.05 moles) in toluene (500 mL) at −78° C. was added dropwise n-hexyllithium (2.3 M in hexane, 72 mL, 0.165 moles). The reaction mixture was stirred and allowed to slowly warm to room temperature and refluxed for 2 hours. After the resulting solution was cooled down to 0° C., 61 mL of 10% HCl aqueous solution was added and the aqueous phase was extracted with ether. The combined organic fractions were dried over anhydrous magnesium sulfate. The product obtained after removing the solvent and remained reactants was confirmed by $^1$H-NMR. (CD$_2$Cl$_2$: d 7.4-7.6 (s, 10, Ph-H), 1.3-1.4 (s, 8, CH$_2$), 1.2 (s, 2, SiCH$_2$) and 0.9 (s, 3, CH$_3$) and 2.3 (br-s, 1, OH) ppm).

Example 3: Compounding Evaluation of Rubber Compositions Containing n-hexylhexamethyltrisiloxan-1-ol Silica Shielding Agent (from Example 1)

Four silica-containing rubber compositions were prepared in a three stage mixing process (i.e., master-batch, remilling, and final batch) according to the formulations shown in Table 1. Samples 1 and 2 contained the silica shielding agent as prepared in Example 1 (i.e., n-hexylhexamethyltrisiloxan-1-ol, one with silica coupling agent (Sample 1) and one without (Sample 2). The silica shielding agent was prepared as described above in Example 1. Samples 3 and 4 did not contain any of the silica shielding agent, and one of these samples contained silica coupling agent and the other did not. The amounts of each ingredient used is reported as parts per hundred rubber (phr). The three-stage mixing process used for these formulations is outlined in Table 1A below. The compounding results of the formulations of Table 1 are shown in Table 2 below.

TABLE 1

Rubber Formulations

| | Sample # | | | |
|---|---|---|---|---|
| | 1 | 2 | 3 | 4 |
| Master-Batch | | | | |
| SBR[a] | 100 | 100 | 100 | 100 |
| Silica[b] | 50 | 50 | 50 | 50 |
| Silica shielding agent | 4.8 | 4.8 | 0 | 0 |
| Silane coupling agent[c] | 4.4 | 4.4 | 4.4 | 0 |
| Antioxidant | 1 | 1 | 1 | 1 |
| Final Batch | | | | |
| ZnO | 2.5 | 2.5 | 2.5 | 2.5 |
| Accelerators | 3.5 | 3.5 | 3.5 | 3.5 |
| Sulfur | 1.4 | 1.4 | 1.4 | 1.4 |

[a]solution styrene-butadiene copolymer (non-functionalized)
[b]Hi-Sil ™ 190 available from PPG Industries of Pittsburgh, Pennsylvania
[c]Bis(triethoxysilylpropyl) disulfide

TABLE 1A

Three Stage Mixing Parameters

| Stage | Time | Condition |
|---|---|---|
| Master-Batch Stage (initial temp: 105° C., rotor rpm started at 50) | 0 seconds<br>30 seconds<br>300 seconds | Charge polymers<br>Charge any oil, filler (e.g., any carbon black and/or silica) and other master-batch ingredients<br>Drop based on time or max temperature of 160° C. |
| Remill Stage (initial temp: 105° C., rotor rpm at 50) | 0 seconds<br>120 seconds | Charge Master Batch<br>Drop on mixing time or max temperature of 130° C. |
| Final Batch Stage (initial temp: 80° C., rotor rpm at 40) | 0 seconds<br>0 seconds<br>120 seconds | Charge Remill<br>Charge curatives<br>Drop on mixing time or max temperature of 110° C. |

TABLE 3

Compounding Results

| | Batch # | | | |
|---|---|---|---|---|
| | 1 | 2 | 3 | 4 |
| Amount of silica shielding agent | 4.8 | 4.8 | 0 | 0 |
| Amount of silica coupling agent | 4.0 | 0 | 4.0 | 0 |
| ML$_{1+4}$ @ 130° C. (indexed) | 67 | 48 | 100 | 100 |
| ts5 (160° C.) in minutes (indexed) | 94 | 136 | 100 | 100 |
| ts90 (160° C.) in minutes (indexed) | 74 | 22 | 100 | 100 |
| G', TS @ 0° C., 2% strain, 10 Hz (indexed) | 81 | 55 | 100 | 100 |
| tan δ, TS @ 0° C., 2% strain, 10 Hz (indexed) | 95 | 99 | 100 | 100 |
| G', TS @ 30° C., 2% strain, 10 Hz (indexed) | 87 | 62 | 100 | 100 |
| G', TS @ 50° C., 2% strain, 10 Hz (indexed) | 97 | 65 | 100 | 100 |
| ΔG', SS @ 50° C., 0.03-15%, 15 Hz (indexed) | 89 | 75 | 100 | 100 |
| tan δ, SS @ 50° C., 5% strain, 15 Hz (indexed) | 79 | 74 | 100 | 100 |
| 50% Modulus @ 23° C. (MPa) (indexed) | 92 | 87 | 100 | 100 |
| 200% Modulus @ 23° C. (MPa) (indexed) | 94 | 88 | 100 | 100 |
| Lambourn abrasion, 25% slip (indexed) | 107 | 58 | 100 | 100 |
| Lambourn abrasion, 65% slip (indexed) | 125 | 91 | 100 | 100 |

Selected properties for each of the rubber compositions discussed above were measured as follows. Data is presented as indexed percentage values, determining by dividing the experimental value (e.g., Sample 1) by the respective value for the control (e.g., Sample 3) and multiplying by 100%.

Cure time: The ts5 and ts90 values reported below are measurements of the time required to achieve 5% and 90% cure, respectively, at a temperature of 160° C. A Monsanto rheometer MDR 2000 from Alpha Technologies was utilized in performing the cure testing; the testing followed the guidance of, but was not restricted to ASTM D-2084. Generally, faster cure times are beneficial, especially with respect to the ts90 value. Therefore, a lower index value for ts5 and ts90 can be considered advantageous.

Mooney Viscosity: The Mooney viscosities disclosed herein were determined at 130° C. using an Alpha Technologies Mooney viscometer with a large rotor, a one minute warm-up time, and a four minute running time, and, hence are referred to as Mooney$_{1+4}$ or $ML_{1+4}$. More specifically, the Mooney viscosity was measured by preheating a sample from each batch to 130° C. for one minute before the rotor starts. The Mooney viscosity was recorded for each sample as the torque at four minutes after the rotor started. Generally, a lower Mooney viscosity is beneficial. Therefore a lower index value for Mooney viscosity can be considered advantageous.

Viscoelastic Properties: Viscoelastic properties of cured rubber compounds were measured by two different methods. The first method is a temperature sweep test (designated TS) conducted with an Advanced Rheometric Expansion System (ARES) from TA Instruments. The test specimen had a rectangular geometry having a length of 47 mm, a thickness of 2 mm, and a width of 12.7 mm. The length of specimen between the grips on the test machine, i.e., the gap, is approximately 27 mm. The test was conducted using a frequency of 3.14 rad/sec. The temperature is started at −120° C. and increased to 100° C. The strain is 0.5% for the temperature range of −100° C. to −21° C., and 2% for the temperature range of −20° C. to 100° C. The second viscoelastic test was a strain sweep (designated SS) conducted with an Advanced Rheometric Expansion System (ARES) from TA Instruments. The test specimen had a cylindrical button geometry having a diameter of 9.27 mm and a 15.6 mm length. The test was conducted using a frequency of 3.14 rad/sec. The temperature was held constant at the desired temperature, i.e., 50° C. The strain was swept from 0.03% to 15%.

Tan δ was measured using a dynamic compression test done with a Dynastat™ mechanical spectrometer (Dynastatics Instruments Corp.; Albany, N.Y.) using a cylindrical button geometry test specimen (7.8 mm diameter×6 mm height). The temperature was held constant at the desired temperature, 0° C. or 60° C. The sample was compressed under a static load of 2 kg before testing. After it reached an equilibrium state, the test started with a dynamic compression load of 1.25 kg at a frequency of 15 Hz. The sample was then dynamically compressed and then extended and the resultant hysteresis (tan δ) was then recorded. Generally, tan δ values at 0° C. for a rubber composition are predictive of wet traction performance when the rubber composition is incorporated into a tire tread (with higher values being beneficial) and tan δ values at 60° C. are predictive of rolling resistance when the rubber composition is incorporated into a tire tread (with lower values being beneficial).

Tensile Properties: Tensile mechanical properties were determined following the guidelines, but not restricted to, the standard procedure described in ASTM-D412, using micro dumbbell specimens with a dimension of 4 mm in width and 1.91 mm in thickness. A specific gauge length of 44 mm was used for the tensile test. Specimens were strained at a constant rate and the resulting force was recorded as a function of extension (strain). Force readings were expressed as engineering stresses by reference to the original cross-sectional area of the test piece. The specimens were tested at 23° C. The same tensile mechanical properties were also tested at 100° C. Maximum stress and maximum strain percentage were also measured at both temperatures.

Abrasion Resistance: Abrasion resistance of the rubber compositions (as a tire wear performance indicator) was measured using a Lambourn Abrasion Tester. A circular test specimen was placed on an axle and run at various slip angles and speeds against a driven abrasive surface. Talc powder was used as a lubricant. The test specimen was weighed before testing and after testing to determine the amount of material loss and a wear index was calculated using the average rate of material loss (typically using 3-5 data points). Measurements of a rubber composition's abrasion resistance in terms of the average rate of material loss are predictive of wear when the rubber composition is incorporated into a tire tread (with lower values being beneficial).

As can be seen from a review of the data in Table 3, the Mooney viscosity of the rubber compositions containing the silica shielding agent is reduced as compared to their respective controls. Sample 1 has an indexed Mooney viscosity of 67% (equating to a reduction in Mooney viscosity of 33%) and Sample 2 has an indexed Mooney viscosity of 48% (equating to a reduction in Mooney viscosity of 52%). The lower Mooney viscosity will result in better dispersion of silica and other fillers.

The data of Table 3 also shows that the tensile properties (i.e., 50% and 200% Modulus) of the rubber compositions containing the silica shielding agent are comparable to their control, with the reduction being no more than about 10% in each of Samples 1 and 2 and less than 10% in the Sample 2 which contained the silica coupling agent. With respect to the viscoelastic properties, the data of Table 3 shows the tan δ at 0° C. (indicative of wet traction) is comparable in the samples containing the silica shielding agent as compared to the control with a reduction of no more than 5%, and the tan δ at 50° C. (indicative of rolling resistance) is lower in the samples containing the silica shielding agent, indicating a beneficial lower rolling resistance from the use of the silica shielding agent.

Additionally, with respect to abrasion resistance, as measured using the weight loss from Lambourn Abrasion testing, the data of Table 3 shows improved abrasion resistance for Sample 2 (containing only silica shielding agent and no silica coupling agent), with an improvement in abrasion resistance of at least about 10%, with the 25% slip having an improvement of about 40%. The use of silica shielding agent in combination with silica coupling agent resulted in abrasion resistance for Sample 1 that was somewhat decreased, but within about 20% of the control at both 25% slip and 65% slip.

The data of Table 3 also shows that the use of the silica shielding agent reduced the Payne effect (Δ G', SS @ 50° C.) which with the use of silica coupling agent alone is more pronounced. The use of the silica shielding agent reduced the effect to within about 30% of the control for Samples 1 and 2, with the Sample having both silica coupling agent and silica shielding agent being within 2% of its control.

As well, the data of Table 3 shows that the cure time for those rubber compositions containing the silica shielding agent are reduced as compared to their control. In particular, the t90 cure data shows a reduction in cure time of 36% for Sample 1 (which contains the silica shielding agent and the silica coupling agent) and a reduction of 78% for Sample 2 (which contains silica shielding agent but no silica coupling agent).

Example 4: Compounding Evaluation of Rubber Compositions n-hexyldiphenylsilanol Silica Shielding Agent (from Example 2)

Four silica-containing rubber compositions were prepared in a three stage mixing process (i.e., master-batch, remilling, and final batch) according to the formulations shown in Table 4. Samples 5 and 6 contained the silica shielding agent as prepared in Example 2 (i.e., n-n-hexyldiphenylsilanol), one with silica coupling agent (Sample 5) and one without (Sample 6). The silica shielding agent was prepared as described above in Example 2. Samples 7 and 8 did not contain any of the silica shielding agent, and one of these samples contained silica coupling agent and the other did not. The amounts of each ingredient used is reported as parts per hundred rubber (phr) in Table 4. The three-stage mixing process used for these formulations is outlined in Table 4A below. The compounding results of the formulations of Table 4 are shown in Table 5 below.

TABLE 4

Rubber Formulations

| | Sample # | | | |
|---|---|---|---|---|
| | 5 | 6 | 7 | 8 |
| Master-Batch | | | | |
| SBR[a] | 100 | 100 | 100 | 100 |
| Silica[b] | 50 | 50 | 50 | 50 |
| Silica shielding agent | 4.4 | 4.4 | 0 | 0 |
| Silane coupling agent[c] | 4.0 | 0 | 4.0 | 0 |
| Antioxidant | 1 | 1 | 1 | 1 |
| Final Batch | | | | |
| ZnO | 2.5 | 2.5 | 2.5 | 2.5 |
| Accelerators | 3.5 | 3.5 | 3.5 | 3.5 |
| Sulfur | 1.4 | 1.4 | 1.4 | 1.4 |

[a]solution styrene-butadiene copolymer (non-functionalized)
[b]Hi-Sil ™ 190 available from PPG Industries of Pittsburgh, Pennsylvania
[c]Bis(triethoxysilylpropyl) disulfide

TABLE 4A

Three Stage Mixing Parameters

| Stage | Time | Condition |
|---|---|---|
| Master-Batch Stage (initial temp: 105° C., rotor rpm started at 50) | 0 seconds | Charge polymers |
| | 30 seconds | Charge any oil, filler (e.g., any carbon black and/or silica) and other master-batch ingredients |
| | 300 seconds | Drop based on time or max temperature of 160° C. |
| Remill Stage (initial temp: 105° C., rotor rpm at 50) | 0 seconds | Charge Master Batch |
| | 120 seconds | Drop on mixing time or max temperature of 130° C. |
| Final Batch Stage (initial temp: 80° C., rotor rpm at 40) | 0 seconds | Charge Remill |
| | 0 seconds | Charge curatives |
| | 120 seconds | Drop on mixing time or max temperature of 110° C. |

TABLE 5

Compounding Results

| | Batch # | | | |
|---|---|---|---|---|
| | 1 | 2 | 3 | 4 |
| Amount of silica shielding agent | 4.4 | 4.4 | 0 | 0 |
| Amount of silica coupling agent | 4.0 | 0 | 4.0 | 0 |
| $ML_{1+4}$ @ 130° C. (indexed) | 69 | 51 | 100 | 100 |
| ts5 (160° C.) in minutes (indexed) | 104 | 160 | 100 | 100 |
| ts90 (160° C.) in minutes (indexed) | 86 | 26 | 100 | 100 |
| G', TS @ 0° C., 2% strain, 10 Hz (indexed) | 103 | 72 | 100 | 100 |
| tan δ, TS @ 0° C., 2% strain, 10 Hz (indexed) | 99 | 111 | 100 | 100 |
| G', TS @ 30° C., 2% strain, 10 Hz (indexed) | 103 | 74 | 100 | 100 |
| G', TS @ 50° C., 2% strain, 10 Hz (indexed) | 106 | 77 | 100 | 100 |
| G', TS @ 50° C., 5% strain, 15 Hz (indexed) | 104 | 74 | 100 | 100 |
| ΔG', SS @ 50° C., 0.03-15%, 15 Hz (indexed) | 118 | 84 | 100 | 100 |
| tan δ, SS @ 50° C., 5% strain, 15 Hz (indexed) | 99 | 86 | 100 | 100 |
| 50% Modulus @ 23° C. (MPa) (indexed) | 90 | 96 | 100 | 100 |
| 200% Modulus @ 23° C. (MPa) (indexed) | 92 | 99 | 100 | 100 |
| Lambourn abrasion, 25% slip (indexed) | 75 | 68 | 100 | 100 |
| Lambourn abrasion, 65% slip (indexed) | 69 | 51 | 100 | 100 |

Selected properties for each of the rubber compositions discussed above were measured as discussed above for Example 3.

As can be seen from a review of the data in Table 5, the Mooney viscosity of the rubber compositions containing the silica shielding agent is reduced as compared to their respective controls. Sample 5 has an indexed Mooney viscosity of 69% (equating to a reduction in Mooney viscosity of 31%) and Sample 6 has an indexed Mooney viscosity of 51% (equating to a reduction in Mooney viscosity of 49%). The lower Mooney viscosity will result in better dispersion of silica and other fillers.

The data of Table 5 also shows that the tensile properties (i.e., 50% and 200% Modulus) of the rubber compositions containing the silica shielding agent are comparable to their control, with the reduction being no more than about 10% in each of Samples 5 and 6. With respect to the viscoelastic properties, the data of Table 5 shows the tan δ at 0° C. (indicative of wet traction) actually improved in the sample containing silica shielding agent without any silica coupling agent (Sample 2) and is comparable in the sample containing both (a reduction of only 1%, Sample 1), and the tan δ at 50° C. which is indicative of rolling resistance when the rubber composition is used in a tire tread is lower in the samples containing the silica shielding agent, indicating a beneficial lower rolling resistance from the use of the silica shielding agent.

The data of Table 5 also shows that the use of the silica shielding agent without any silica coupling agent reduced the Payne effect (Δ G', SS @ 50° C.) which with the use of silica coupling agent alone is more pronounced. Use of the silica shielding agent alone produced a result that was 74% of its control.

Additionally, with respect to abrasion resistance, as measured using the weight loss from Lambourn Abrasion testing, Samples 5 and 6 both showed improved abrasion resistance as compared to the control. This data shows that the use of the silica shielding results in an improvement in abrasion resistance of at least 15%, with the 25% slip having an improvement of 25% when the silane coupling agent is used along with the silica shielding agent and 32% when no silica coupling agent is used, and the 65% slip having an improvement of at least 15%, with an improvement of 31% when the silane coupling agent is used along with the silica shielding agent and 49% when no silica coupling agent is used.

As well, the data of Table 5 shows that the t90 cure time for those rubber compositions containing the silica shielding agent are reduced as compared to their control. In particular, the t90 cure data shows a reduction in cure time of 14% for Sample 5 (which contains the silica shielding agent and the silica coupling agent) and a reduction of 74% for Sample 6 (which contains silica shielding agent but no silica coupling agent).

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A vulcanizable rubber composition comprising:
   (a) 100 phr of at least one conjugated diene-based polymer or copolymer;
   (b) silica filler;
   (c) 1 to 20 phr of a silica shielding agent having the following formula (I):

$$R^1(SiR^2R^3O)_nH \qquad (I),$$

wherein $R^1$ is hydrocarbyl having 4 to 20 carbons,
   $R^2$ and $R^3$ are independently selected from phenyl, substituted phenyl, and hydrocarbyl of C1-C4, and
   n is an integer from 1-10,
   wherein the rubber composition contains 0 phr of silica coupling agent.

2. The rubber composition of claim 1, wherein $R^2$ and $R^3$ each independently comprise phenyl or substituted phenyl.

3. The rubber composition of claim 1, wherein $R^2$ and $R^3$ each independently comprise hydrocarbyl having 1 to 4 carbons.

4. The rubber composition of claim 1, wherein $R^2$ and $R^3$ each independently comprise phenyl.

5. The rubber composition of claim 1, wherein $R^1$ comprises hydrocarbyl having 6 to 12 carbon atoms.

6. The rubber composition of claim 1, wherein $R^1$ comprises linear or branched alkyl.

7. The rubber composition of claim 1, comprising 5 to 150 phr of the silica filler.

8. The rubber composition of claim 1, comprising 1 to 10 phr of the silica shielding agent.

9. The rubber composition of claim 1, comprising 2 to 5 phr of the silica shielding agent.

10. The rubber composition of claim 1, wherein at least one of the following is met:
    the at least one conjugated diene-based polymer or copolymer comprises one or more of polyisoprene, polybutadiene, butadiene-isoprene copolymer, butadiene-isoprene-styrene copolymer, isoprene-styrene copolymer, styrene-butadiene copolymer, natural rubber, butyl rubber, and halogenated butyl rubber; or
    the rubber composition further comprises 5 to 200 phr (in total) of reinforcing filler.

11. A vulcanized rubber composition comprising a mixture of
    (a) 100 phr of at least one conjugated diene-based polymer or copolymer;
    (b) silica filler;
    (c) 1 to 20 phr of a silica shielding agent having the following formula (I):

$$R^1(SiR^2R^3O)_nH \qquad (I),$$

wherein R¹ is hydrocarbyl having 4 to 20 carbons,
R² and R³ are independently selected from phenyl, substituted phenyl, and hydrocarbyl of C1-C4, and
n is an integer from 3-10, and
(d) a cure package,
wherein the rubber composition contains 0 phr of silica coupling agent and the mixture has been vulcanized.

12. A tire having at least one portion thereof formed from the rubber composition of claim 1.

13. A vulcanized rubber composition comprising
(a) 100 phr of at least one conjugated diene-based polymer or copolymer;
(b) 50 to 200 phr of silica filler;
(c) 1 to 20 phr of a silica shielding agent having the following formula (I):

R¹(SiR²R³O)$_n$H  (I), wherein R¹ is hydrocarbyl having 4 to 20 carbons,
R² and R³ are independently selected from phenyl, substituted phenyl, and hydrocarbyl of C1-C4, and
n is an integer from 3-10, and
(d) a cure package,
wherein the rubber composition comprises 0 phr of silica coupling agent.

14. The rubber composition of claim 13, wherein R² and R³ each independently comprise phenyl or substituted phenyl.

15. The rubber composition of claim 13, wherein R² and R³ each independently comprise hydrocarbyl having 1 to 4 carbons.

16. The rubber composition of claim 13, comprising 5 to 150 phr of the silica filler.

17. The rubber composition of claim 13, comprising 1 to 10 phr of the silica shielding agent.

18. The rubber composition of claim 13, comprising 2 to 5 phr of the silica shielding agent.

19. The rubber composition of claim 13, wherein R1 comprises hydrocarbyl having 6 to 12 carbon atoms and R2 and R3 comprise phenyl.

20. The rubber composition of claim 13, wherein R1 comprises hydrocarbyl having 6 to 12 carbon atoms and R2 and R3 comprise methyl.

* * * * *